United States Patent [19]

Araya et al.

[11] 3,998,329
[45] Dec. 21, 1976

[54] CARD SORTING APPARATUS

[75] Inventors: Kenzo Araya; Takashi Hashimoto, both of Tokyo, Japan

[73] Assignee: Tanaka Seiki Co., Ltd., Tokyo, Japan

[22] Filed: June 5, 1975

[21] Appl. No.: 584,114

[30] Foreign Application Priority Data

June 26, 1974 Japan .............................. 49-72232

[52] U.S. Cl. .............................. 209/74 M; 271/80
[51] Int. Cl.² ....................................... B65G 47/34
[58] Field of Search .................... 209/74, 74 M, 73; 271/80, 213, 172; 235/92 SB

[56] References Cited

UNITED STATES PATENTS

| 3,301,550 | 1/1967 | Reinecke | 271/80 X |
| 3,460,673 | 8/1969 | Sanner | 209/74 R |

Primary Examiner—Allen N. Knowles
Attorney, Agent, or Firm—Oblon, Fisher, Spivak, McClelland & Maier

[57] ABSTRACT

A card sorting apparatus wherein a card is fed one by one from a card hopper, information included on the card is read at a card sensing stage provided along a card feeding path and the card with a specified information is selected comprises: (a) a card reading station at the card feeding path of the card fed one by one from the card hopper which includes means for reading the information on the card fed therethrough, for comparing the read information with a specified information already stored in the station and for generating a signal accordingly; (b) a card path shifting mechanism included after the card reading station along the card feeding path for shifting its position from a first position to a second position, the first position corresponding to a first path of the card being shifted and the second position to a second path of the card, and the width between the two paths being less than that of the card when forwarded; (c) means for driving the card path shifting mechanism from its first position to the second position in response to the signal from the card reading station; (d) a card stacker which receives and stacks the card in the order it is received; and (e) a card feeder which feeds the card one by one into the card stacker holding the card as shifted in the first path or in the second path.

5 Claims, 5 Drawing Figures

CARD SORTING APPARATUS

BACKGROUND OF THE INVENTION

1. Field of the Invention:

This invention relates to an apparatus and its system for sorting, among plural cards each with coded information, a card or cards with a specified information.

2. Description of the Prior Art

In order to select cards with a specified information among plural cards, it has conventionally been utilized the card selector system for the cards with necessary data. In such system, cards are separated into cards with desired information (hereinafter referred to as YES card) and those without such desired information (hereinafter referred to as NO card), thus necessitating two separate card stackers. According to this conventional system coded information on the cards to be fed one by one from the card hopper is read or sensed at a card reading or sensing station provided at a card feeding path, and the YES cards are stacked into one of the card stackers while the NO cards into the other stacker. Another selecting system has been proposed wherein cards are sorted into plural card pockets according to the read or sensed information.

According to these system, since cards are sorted into separate plural stackers or pockets, the order of the cards at the card hopper is lost during sorting procedure. In order to recover the original order of the cards once separated as above, considerable times of card sorting process have to be repeated.

SUMMARY OF THE INVENTION

It is therefore an object of the present invention to provide a new card sorting apparatus and its system.

It is another object of the present invention to provide a card sorting apparatus and its system wherein the cards are stacked in the original order accumulated in the card hopper.

It is further detailed object of the present invention is to provide a card sorting apparatus and its system wherein the cards are stacked into a single card stacker maintaining the original card order but into two shifted positions.

According to this invention, cards contained in a card hopper are fed one by one from the card hopper into the final card stacker along the card feeding path. Along the card feeding path thus defined between the card hopper and the card stacker a card sensing or reading station is provided where information on each card is read as a YES card or a NO card. The read card is then fed either to a first path or to a second path according to the information born on the card, the two paths being slightly shifted from each other. The card is stacked into the card stacker holding the shifted position from another kind of (YES or NO) card. Therefore the YES cards and NO cards are stacked in the card stacker in a clearly shifted position from each other. And moreover the order of cards stacked is same as that of the cards in the card hopper before they are treated.

The operator of the apparatus can see the proportion of YES and NO cards in the stacker immediately, and the next operation may be started by feeding these cards again from the card hopper. After repeating the operation the order of cards does not change.

Taking the example of customer card operation, the first operation may be to see the proportion, to all of the cards, of the cards of customers being male who already bought a certain goods, and the next operation may be to see the number of customers of female who bought another goods.

The system of this invention may further include or combine any additional treating system or systems on the selected card or using the selected card at the card feeding path. For example, the system may further be so constructed that the data on the selected card may be read; the data may be transferred to other data processing unit; or the data of the selected card may be printed to a required sheet or the like. It will be understood that thus further treated and non-treated cards may be shifted from each other but are stacked in the card stacker in the order as accumulated in the card hopper.

BRIEF DESCRIPTION OF THE DRAWINGS

Further objects and advantages of the invention will become more apparent in the detailed description of the preferred embodiment presented below. In the detailed description of the preferred embodiment of this invention, reference is made to the accompanying drawings, in which.

DETAILED DESCRIPTION OF THE PREFERRED EMBODIMENT

Figure 1:
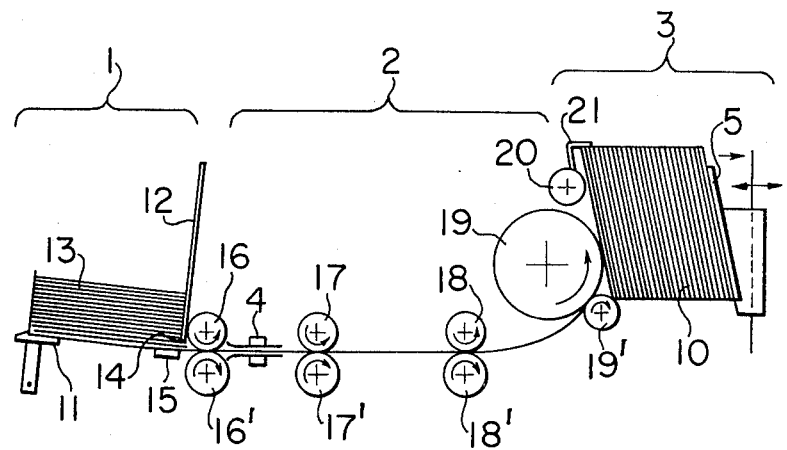
FIG. 1 is a schematic view of the apparatus according to the present invention.

In FIG. 1, 1 denotes a card hopper where cards 13 to be sorted are accumulated. At the underside of the card hopper 1 is swingably supported a feeding pawl 11, which feeds cards out of the card hopper 1 one by one by its swinging movement through a gate 14 which is defined by a standing plate or hopper wall 12 and a lower support 15. The card 13 from the hopper 1 is then forwarded into a card feeding path 2 through a pair of feeding rollers 16, 16'. Next to the rollers 16,16' along the card feeding path is a card reading or sensing station 4 comprising means which detects photoelectrically coded information on the card, compares the information with the specified information and generates a signal at the time when the card does not bear a desired coded data, namely if the card is a NO card. The station 4 may further include means to read other coded information from YES or NO card thus sensed.

Figure 2:
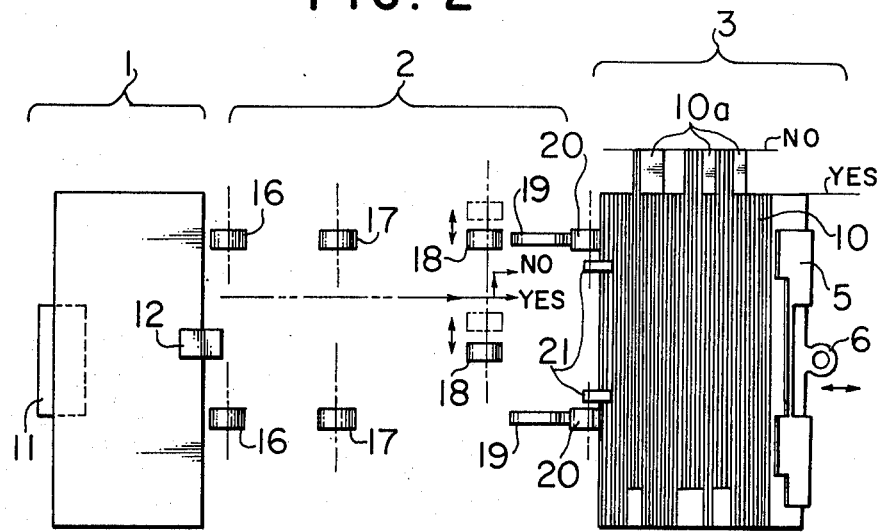
FIG. 2 is a plan view of the apparatus shown in FIG. 1.

The card which passes the reading station 4 is then advanced to a pair of feeding rollers 17,17' and further to a pair of third rollers or card path shifting rollers 18,18'. The rollers 18, 18' can move between two positions, one as shown in real lines and another as shown in chain lines in FIG. 2. When the card is read as NO card or when the card does not bear desired information, it is shifted to the chain line position (=second position) as shown in FIG. 2, after the leading edge of the card is engaged with the rollers 18, 18' and its trailing edge is disengaged from the second rollers 17, 17', by means of the rollers 18, 18' holding the card while rotating. While holding the shifted position, the card is advanced to card rollers or fourth rollers 19, 19'. When the trailing edge of the card passes the card path shifting rollers 18, 18', the rollers 18, 18' return to the original position shown in real line. The NO cards are thus stacked in the card stacker 3 at somewhat shifted position laterally from the YES cards while keeping the original order as they are accumulated in the card hopper. The shifted line for NO cards is shown as NO in FIG. 2 while the YES line is shown as YES.

Figure 3:
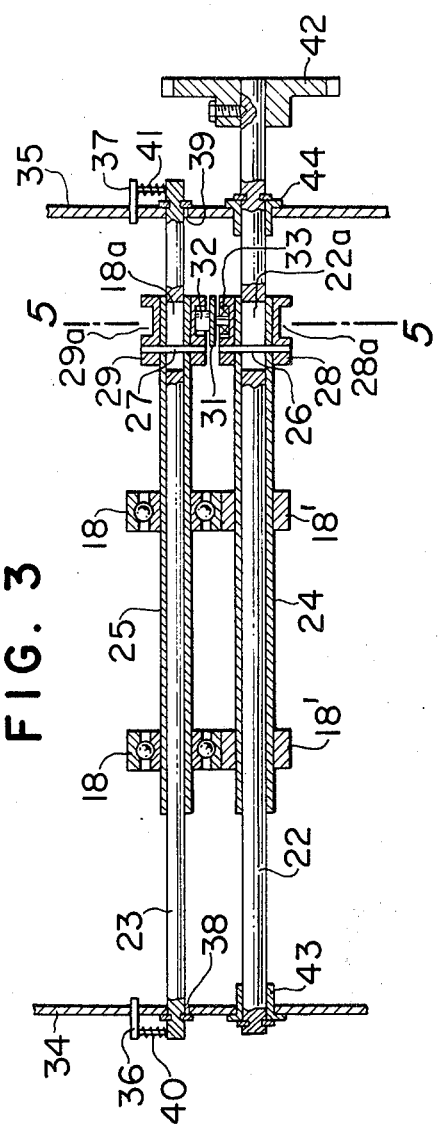
FIG. 3 is a schematic view of the card path shifting rollers used in the apparatus according to the present invention.

The preferred embodiment of the card path shifting rollers is explained in further detail with reference to the attached FIGS. 3, 4 and 5. In FIG. 3, 34, 35 are side frames of the card sorting apparatus according to the present invention. To a pair of elongated holes 38, 39 in the side frames 34, 35 is inserted an upper roller shaft 23 whose side ends are fixed with washers, thus preventing its axial movement. Above the both ends of the shaft 23 a pair of support members 36, 37 are provided. Pins mounted at right angles to the support members 36, 37 are inserted into the holes 38, 39 at the both ends of the shaft 23 and prevent rotation of the shaft 23. Between the support members 36, 37 and the shaft 23 are provided respectively springs 40, 41 to urge the shaft 23 downwardly.

To the shaft 23 is mounted an axially movable sleeve 25, where are provided a pair of radial contact ball bearings 18, 18 forming rollers 18, 18. To the right hand (in FIG. 3) of the sleeve 25 is fixed a flange 29. Corresponding to the position of the flange 29, a slot 18a is provided in the shaft 23. A pin 27 is inserted into the slot 18a radially through the sleeve 25 and the flange 29. Around the outer surface of the flange 29 is provided a peripheral groove 29a.

A lower roller shaft 22 is rotatably mounted on a pair of bearings 43, 44 provided on the side frames 34 and 35, respectively. At one end of the shaft 22 is mounted a gear 42 to be engaged with another gear, not shown, in order to transmit rotation to the shaft 22.

To the shaft 22 is slidably mounted a sleeve 24, where are provided a pair of rollers 18', 18' of resilient material, such as rubber, corresponding to the pair of radial contact ball bearings 18, 18. To the right end of the sleeve 24 is mounted a pipe constituting a flange 28 having a peripheral groove 28a therearound.

The flange 28 and the sleeve 24 are fixed with a pin 26 which passes through a slot 22a of the shaft 22. The sleeve 24 is constructed as slidable axially to the shaft 22 and also as being rotated following the rotation of the shaft 22.

Figure 5:
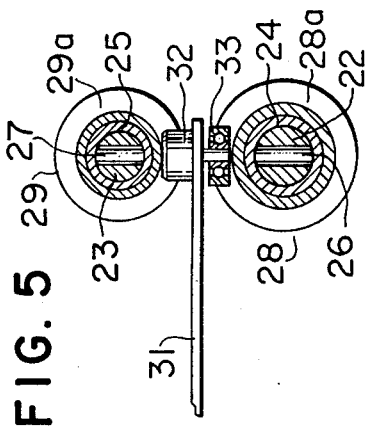
FIG. 5 is an explanatory view showing the relation of the shifting roller assembly and the shifting roller driving assembly, being a view cut along the line 5—5 of FIG. 3.
Figure 4:
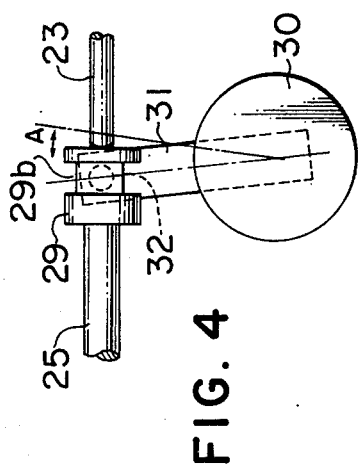
FIG. 4 is an enlarged view of the card path shifting mechanism.

FIGS. 4 and 5 show the relation of the card path shifting mechanism according to this invention and means for driving the shifting mechanism. The means for driving the mechanism shown includes a rotary solenoid 30 and an arm 31 which swings when the rotary solenoid is actuated. To the leading end of the arm 31 are mounted a radial contact ball bearing 33 and a pin 32 connected between the grooves 29a and 28a of the flanges 29, 28, respectively of the above referred to shifting mechanism. Therefore the outer size of the bearing 33 is smaller than the width of the groove 28a.

By the actuation of the rotary solenoid 30, the swinging arm 31 rotates approximately 30° to the direction marked A, and the arm returns to its original position by means of a spring, not shown, as soon as the deactuation of the solenoid. The rotary solenoid 30 is actuated, in response to the NO signal generated from the card reading station 4, when the trailing edge of the NO card is disengaged from the rollers 17, 17'. The solenoid 30 is deactuated when the NO card is disengaged from the rollers 18, 18'. It will be realized that the rotating angle of the arm 31 corresponds to the length of the slots 18a and 22a where the pins 27 and 26 respectively move.

The card disengaged from the rollers 18, 18' is fed into the card stacker 3 by means of the fourth rollers 19, 19'. 20 is an idle roller and the roller 20 is fixed at the upper part of the card stacker 3. L-shaped member 21 is an abutting member for limiting the upper position of the cards being stacked in the card stacker.

A block 6 in the card stacker 3 and a plate 5 fixed thereto are constructed as to retreat when the cards are fed into the card stacker 3, in order to keep a space at the inlet of the card stacker 3 for receiving cards thereinto.

The operation of the apparatus according to the present invention is as follows:

The card supplied from the card hopper 1 one by one is forwarded to the card reading station 4 by means of the first rollers 16, 16', where necessary data on the card is read. If the card is a NO card, the card path is shifted into the NO path at the card path shifting mechanism and stacked into the NO line, 10a, of the card stacker 10. If the card is a YES card, it is guided into the card stacker 3 without shifting its path, and stacked along the YES line in the stacker 3.

As above mentioned, the cards are stacked in a single card stacker without changing the original order, in the form of clearly shifted position from each other. It will be therefore easily understood that since it is not necessary to prepare plural stackers for YES and NO cards, the size of the whole apparatus becomes small.

The present system may be combined with additional system on either of or the other of the cards to be sorted. For example, if another reading station is provided other than or within the station 4 for reading other information born in the YES card, such as summing the stored information, the proportion of the sum of the YES cards to the whole cards may be estimated. As mentioned above, if the cards include master addresses therein, the printing means may be combined, where the master address of either YES or NO card may be printed to any desired sheet, envelope or the like.

The preferred embodiment is constructed as to shift the NO cards, but it is of course possible to construct the apparatus to shift YES cards in lieu of the NO cards.

Although the invention has been described in detail with particular reference to a preferred embodiment thereof, it will be understood that further variations and modifications can be effected within the spirit and scope of the invention. For example, selected cards may be shifted by any other means, such as kicking the selected cards at their side portions by a pin or the like which is actuated by the electromagnetic device into the shifted line in the card feeding path.

What we claim is:

1. A card sorting apparatus wherein a card is fed one by one from a card hopper, information included on the card is read at a card sensing stage provided along a card feeding path and the card with a specified information is selected which comprises:

a. a card reading station at the card feeding path of the card fed one by one from the card hopper which includes means for reading the information on the card fed therethrough, for comparing the read information with a specified information already stored in the station and for generating a signal accordingly, b. a card path shifting mechanism including a pair of rollers which are included at the card feeding path and which can move at right angles with the direction of the card feeding path, holding the card therebetween, being arranged after the card reading station along the card feeding path for shifting its position from a first position to a second position, the first position corresponding to a first path of the card being shifted and the second position to a second path of the card, and the width between the two paths being less than that of the card when forwarded, c. means for driving the card path shifting mechanism from its first position to the second position in response to the signal from the card reading station, comprising an electromagnetic device which moves an armature when it receives the signal from the card reading station and a mechanism which moves said pair of rollers in response to the movement of the armature, d. a card stacker which receives and stacks the card in the order as it is received, and e. a card feeder which feeds the card one by one into the card stacker holding the card as shifted either in the first path or in the second path.

2. A card sorting apparatus according to claim 1, wherein the electromagnetic device is a rotary solenoid.

3. A card sorting apparatus according to claim 1, wherein the first position of the card path shifting mechanism is that to forward the card to a card stacker without shifting its feeding path.

4. A card sorting apparatus according to claim 1, wherein the means for driving the card path shifting mechanism drives the card path shifting mechanism after the card is disengaged from feeding rollers placed at the beginning part of the card feeding path and when the card is engaged with the card path shifting mechanism.

5. A card sorting apparatus wherein a card is fed one by one from a card hopper, information included on the card is read at a card sensing stage provided along a card feeding path and the card with a specified information is selected which comprises:

a. a card reading station at the card feeding path of the card fed one by one from the card hopper which includes means for reading the information on the card fed therethrough, for comparing the read information with a specified information already stored in the station and for generating a signal accordingly, b. a card path shifting mechanism including a pair of rollers which are included at the card feeding path and which can move at right angles with the direction of the card feeding path, holding the card therebetween, wherein one of the rollers is a radial roller bearing, being arranged after the card reading station along the card feeding path for shifting its position from a first position to a second position, the first position corresponding to a first path of the card being shifted and the second position to a second path of the card, and the width between the two paths being less than that of the card when forwarded, c. means for driving the card path shifting mechanism from its first position to the second position in response to the signal from the card reading station, d. a card stacker which receives and stacks the card in the order as it is received, and e. a card feeder which feeds the card one by one into the card stacker holding the card as shifted either in the first path or in the second path.

* * * * *